United States Patent [19]
Williams et al.

[11] Patent Number: 5,965,030
[45] Date of Patent: Oct. 12, 1999

[54] REUSABLE MAT FOR REMOVING LIQUID CONTAMINANTS

[75] Inventors: Martin M. Williams, Harrisburg; Rodney J. Trahan, Jr., China Grove; Kenneth R. Rose, Denver, all of N.C.

[73] Assignee: Rohm and Haas Company, Phila., Pa.

[21] Appl. No.: 08/842,582

[22] Filed: Apr. 15, 1997

[51] Int. Cl.$^6$ .................................................. C02F 1/42
[52] U.S. Cl. ................ 210/680; 210/671; 210/924; 210/507; 210/508; 442/121
[58] Field of Search ..................... 210/670, 671, 210/679, 680, 502.1, 508, 507, 924; 442/121

[56] References Cited

U.S. PATENT DOCUMENTS

| | | |
|---|---|---|
| 3,679,058 | 7/1972 | Smith . |
| 3,888,766 | 6/1975 | DeYoung . |
| 3,917,528 | 11/1975 | Orban et al. . |
| 4,031,839 | 6/1977 | Pedone . |
| 4,070,287 | 1/1978 | Wiegand et al. . |
| 4,559,243 | 12/1985 | Passler et al. ..................... 427/209 |
| 4,569,707 | 2/1986 | Johnson ................................. 156/78 |
| 4,581,287 | 4/1986 | Smith et al. . |
| 5,066,405 | 11/1991 | Liston et al. . |

FOREIGN PATENT DOCUMENTS

| | | |
|---|---|---|
| 07033081 | 3/1995 | Japan . |
| 1414826 | 11/1975 | United Kingdom . |
| WO 9603211 | 2/1996 | WIPO . |

*Primary Examiner*—Christopher Raimund
*Attorney, Agent, or Firm*—Ronald D. Bakule, Patent Agent

[57] ABSTRACT

This invention relates to a method for removing liquid contaminant from surfaces, especially for removing spilled oil from the surface of water. More particularly, this invention relates to a method for removing liquid contaminant from a surface by applying a mat which is a nonwoven fabric having a dried substantially continuous aqueous foam coating on at least one side of the nonwoven fabric, whereby the foam coating absorbs at least some of the liquid contaminant. This invention also relates to a reusable mat for removing liquid contaminants from surfaces and a method for reusing the mat.

1 Claim, No Drawings

REUSABLE MAT FOR REMOVING LIQUID CONTAMINANTS

This invention relates to a method for removing liquid contaminants from surfaces, especially for removing spilled oil from the surface of water. More particularly, this invention relates to a method for removing liquid contaminant from a surface by (a) forming a nonwoven fabric; (b) applying a substantially continuous aqueous foam coating composition having an air to liquid ratio from 5 to 1 to 20 to 1 by volume and incorporating an emulsion polymer binder, to at least one side of the nonwoven fabric; (c) drying the foam coating; and (d) placing the dried foam coating on the liquid contaminant, whereby the foam coating absorbs at least some of the liquid contaminant. This invention also relates to a reusable mat for removing liquid contaminants from surfaces and a method for reusing the mat.

The present invention serves to provide a liquid sorbant mat in which a polymeric foam coating provides for absorption of the liquid contaminant and transport of the liquid contaminant to a nonwoven substrate which may serve as a reservoir for the contaminant. In the case of absorbing substantially water-insoluble liquid from the surface of water, the foam coating also functions as a selective barrier by substantially preventing the passage of water to the nonwoven and also serves a role in ensuring flotation of the mat, i.e., that the density of the foam-coated mat is and remains lower than the density of the water during the desired exposure time. The liquid sorbant mat is mechanically strengthened by its nonwoven component, strength which is required for handling, use and, especially, for reuse by mechanically expelling absorbed liquid from the mat.

U.S. Pat. No. 4,031,839 discloses a reusable oil-absorbing pad in which the absorbent pad is contained in an inner and an outer bag. The reusable pad consists of a particulate mass of expanded open pore resin, particularly of alternating layers of large (10,000 to 5,000 microns) medium (5,000 to 2,000 microns) and small (less than 2,000 microns) particles of expanded synthetic material such as rigid polyurethane foam. However, the assembly of the pads from separate components and the provision of particles of particular sizes adds production complexity and cost to the absorbent pad.

GB 1,414,826 discloses an oil-capturing network structure formed from a foamed resin filled with an inorganic calcium compound such as a polyethylene and 30–80 wt. % calcium sulfate into which a liquefied gas has been introduced under pressure and released. The structure is disclosed to be readily disposable such as by incineration after use. However, additional reinforcement of the structure which would facilitate reuse was not disclosed.

The problem faced by the inventors is the provision of an alternative method for removing liquid contaminant from a surface such as, for example, oil from the surface of ocean water with a reusable absorbent structure; a reusable absorbent mat suitable for removing liquid contaminant from a surface; and a method for reusing a mat suitable for removing liquid contaminant from a surface.

In a first aspect of the present invention there is provided a method for removing liquid contaminant from a surface including:

(a) forming a nonwoven fabric;
(b) applying a substantially continuous aqueous foam coating composition having an air to liquid ratio from 5 to 1 to 20 to 1 by volume, the coating composition incorporating an emulsion polymer binder, to at least one side of the nonwoven fabric;
(c) drying the foam coating;
(d) contacting the liquid contaminant with the dried foam coating, whereby the foam coating absorbs at least some of the liquid contaminant.

In a second aspect of the present invention there is provided for a reusable mat suitable for removing liquid contaminant from a surface including a nonwoven fabric bearing a substantially continuous dried foam coating, the coating including an emulsion polymer binder, and the dried foam coating having a density of from 0.02 to 0.10 grams per cubic centimeter, disposed on at least one side of the mat.

In a third aspect of the present invention there is provided a method for reusing a mat suitable for removing liquid contaminant from a surface including:

(a) contacting the liquid contaminant with a mat including a dried foam coating, the coating having a density of from 0.02 to 0.10 grams per cubic centimeter, the coating disposed on at least one side of a nonwoven fabric, whereby the foam coating absorbs at least some of the liquid contaminant;
(b) removing the mat from any remaining liquid contaminant;
(c) expelling at least some of the absorbed liquid contaminant;
(d) placing the previously used foam coating on remaining liquid contaminant.

The reusable mat suitable for removing liquid contaminant from a surface of this invention has at least two layers: a layer of nonwoven fabric bearing a layer of substantially open cell foam. Preferably, the nonwoven fabric is disposed between, and attached to, two layers of substantially continuous open cell foam.

Preferred fibers constituting the nonwoven fabric are cotton, rayon polypropylene, nylon, and polyester. Polyester fibers are more preferred. Reclaimed soft drink bottles that have been made into a polyester fibers sold under the trade name Quline™ by Wellman Fibers, Inc. provide more preferred fibers for the nonwoven fabric.

The nonwoven fabric is preferably between 0.1–5.0 cm. in thickness, more preferably between 0.15–2.5 cm. in thickness, and most preferably between 0.25–1.3 cm. in thickness. The preferred nonwoven fabric is made by first carding polyester fibers, then, optionally, bonding the fibers, preferably by resin bonding or heat treatment, and, finally, needle punching the bonded non-woven fabric to give it added strength. Depending on the fiber used, the strength and other properties desired, any other method of manufacturing the substrate may be used. For example, nonwoven fabrics made from carded fibers, needle punched fibers, thermally bonded fibers, or resin bonded fibers may be used.

In addition to the nonwoven fabric, the mat has at least one layer of open-cell foam coating attached to it. By "open-cell foam coating" herein is meant a coating containing, when dried, holes or pores or cells, the predominant number of which are connected to other pores, thereby providing channels available for liquid transport from the outer surface of the foam coating to the nonwoven to which it is attached. By "attached" to the nonwoven herein is meant that the foam coating, which is applied to the nonwoven as an aqueous coating and then dried, is sufficiently affixed to the nonwoven that the dried coating does not become substantially delaminated or separated from the nonwoven during the formation, use, or reuse of the reusable mat of this invention. The open cell foam is believed to act as a selective barrier. The foam layer substantially prevents the nonwoven fabric from absorbing water when the liquid contaminant to be removed is floating on water and may aid in retaining absorbed liquid contaminant by acting as a reservoir. The foam coating composition contains at least one emulsion polymer formed by the emulsion polymerization in predominantly aqueous medium by conventional techniques of at least one ethylenically-unsaturated monomer such as, for example, $C_1$–$C_{22}$ alkyl (meth)acrylates, styrene, butadiene, vinyl acetate, vinylidene chloride, vinyl chloride, ethylene, (meth)acrylonitrile; or polyurethane emulsions; or mixtures thereof Low levels such as from 1–10% of functional monomers bearing carboxylic acid, hydroxyl, etc. groups may also be incorporated into the emulsion polymer. A preferred foam contains an emulsion polymer formed by the emulsion polymerization of a predominant amount of at least one $C_2$–$C_4$ alkyl acrylate.

The foam coating composition contains the emulsion polymer. Prior to foaming, it is preferred to adjust the pH of the foam coating composition to between 8.0 and 10.0, preferably with ammonium hydroxide. The foam coating composition may also contain pigments and foaming aids, such as surfactants and foam stabilizers. In addition, colorants, thickeners, cross-linkers, anti-static agents, antimicrobial agents, silicones, fluorocarbons, and flame retardants, for example, may be added. Pigments which may be used include clays, titanium dioxide, talc, feldspar, pyrophyllite, alumina and calcium carbonate. In some cases no pigment is used. The pigment amount is typically from 0 to 400 parts by weight of dry pigment per hundred parts dry emulsion polymer. Preferred is a pigment amount of about 140 to about 170 parts by weight of dry pigment per 100 parts dry emulsion polymer.

In order to produce a foam coating composition having the desired properties, that is, a microporous cellular structure with interconnecting cells, the aqueous foam coating composition is foamed or aerated to a blow ratio of 5 to 1 to 20 to 1, lower blow ratios providing insufficient void volume for effective absorption and higher blow ratios providing a fragile dried foam, and preferably 8 to 1 to 10 to 1. "Blow ratio" is defined herein as the ratio of parts of air to parts of liquid by volume and is a measure of the foam density. Foaming may be accomplished using any conventional industrial or laboratory equipment, for example, an Oakes foamer, a "Super Foamer" from Latex Equipment Sales and Service Co., a Hobart mixer, a Kitchen-Aid mixer or a hand mixer.

The aqueous foam coating composition having the desired density is then coated onto the nonwoven fabric, typically without any surface treatment of the nonwoven fabric. Coating may be accomplished using any suitable coating method which gives the desired coat weight or thickness. For example, a Gardner knife, rod coater, or similar means can be used for this purpose. Although the aqueous foam coating composition may be applied to only one side of the nonwoven fabric, the aqueous foam coating composition is preferably applied to both surfaces of the nonwoven fabric. For example, a mat used to clean up oil in a garage need not be coated on both sides since preventing contamination of the nonwoven fabric is not an issue. However, a mat used to remove liquid oil from a body of water must be coated on both sides to prevent excess water absorption by the nonwoven fabric. The amount of foam applied is between 10 and 340 grams per sq. meter, preferably between 34 and 102 grams per sq. meter. The foam coating should preferably uniformly and continuously cover the entire substrate surface. Preferably, both surfaces of the mat are coated with the same amount of foam. The mat with the foam may be dried at between 100 and 400° F. to dry the foam and concurrently to affix the foam to the nonwoven fabric. The dried foam coating typically has a density of 0.02 to 0.10 grams per cubic centimeter.

The mat of the present invention can be made in either discrete pieces or in continuous bolts of mat material. The size of discrete pieces of mat material may vary from about 1 cm. by 1 cm, for small cleanup jobs, for example cleaning oil from skin, to about 10 meters by 10 meters, for large jobs, such as cleaning oil-contaminated water from a ruptured bulk oil tanker. The width of a continuous bolts of mat material may vary from about 2 meters to about 20 meters. A continuous bolt of mat may be as long as it can be made, for example between 20 and 100 meters. The size of the equipment available for mat handling dictates the final size of the mat. The handling equipment must accommodate the size of the mat, especially in the case where the mat is recovered after liquid contaminant absorption and the excess liquid contaminant is expressed from the mat to permit mat reuse. If mats are to be placed and taken up by hand, then smaller sizes are preferred. Removing oil contaminant from rough water generally requires mats of smaller size.

The mat, whether used on a solid surface or on water, has sufficient strength that once liquid contaminant has been absorbed by the mat, the mat may then be compressed to remove excess liquid contaminant. The liquid contaminant collected in such a manner can be refined or otherwise appropriately disposed of The mats of the invention absorb between 5 and 50 times their weight in liquid contaminant, preferably between 10 and 25 times their weight in liquid contaminant. The mat may be compressed by any conventional means, for example, by running an liquid contaminant-soaked mat through a wringer. Preferably the mats can be reused up to 10 times.

In one embodiment the mats of this invention are used for absorbing oil spilled in coastal waters or the open ocean. In this embodiment larger pieces of the mat are preferred to obtain good coverage of as much of the affected area as possible. The mats are retrieved after absorbing oil and the oil is removed by squeezing the mat and the mat is replaced in the ocean to absorb more oil.

EXAMPLES

Example 1

A foam coating composition was prepared; it contained 87.3 g emulsion polymer, poly(butyl acrylate/ethyl acrylate/methyl acrylate/acrylonitrile/N-methoylacrylamide/itaconic acid/methacrylic acid) to which 1.4 g ammonium hydroxide, 3.0 g melamine resin crosslinking agent, 1.2 g foaming agent, 4.3 g ammonium sterate, 1.0 g ammonium nitrate, 1.0 g silicone fluid and 0.8 g thickener were added. A 183 g./m.$^2$ needle-punched Quline™ polyester mat was foam coated with 128.8 g./m.$^2$ (64.4 g./m.$^2$ on each side) of an open cell acrylic foam that had been mixed in a KitchenAid™ blender until a blow ratio of 8 to 1 had been achieved.

The foam compound latex was coated on the substrate using a Gardner knife at a thickness of 50 mils. The foam coating was dried in an oven at 149° C. and then the other side was coated and dried.

A 6.35 cm. by 6.35 cm. square of the mat was placed in a large beaker of water which had a layer of motor oil (10w30) placed on top. The mat which weighed 1.1 grams absorbed 13 times its weight in oil. The mat was squeezed with nip rollers and reused two more times. The mat absorbed between 11 and 13 times its weight in oil each time.

This example describes the method of making, using, and reusing the liquid contaminant-sorbent mat of the invention.

What is claimed is:

1. A method for removing liquid hydrocarbon from a water surface comprising:

(a) forming a nonwoven fabric;

(b) applying a substantially continuous aqueous foam coating composition having an air to liquid ratio from 5 to 1 to 20 to 1 by volume, said coating composition comprising an emulsion polymer binder, to both sides of said nonwoven fabric;

(c) drying said foam coating, wherein the density of said dried foam-coated mat is less than the density of water; and (d) contacting said liquid hydrocarbon contaminant with said dried foam coating, whereby said foamed coating absorbs at least some of said liquid hydrocarbon contaminant.

* * * * *